Oct. 8, 1968     D. E. RUNKLE ET AL     3,404,714
PLANER ATTACHMENT FOR RADIAL ARM SAW
Filed Aug. 1, 1966     2 Sheets-Sheet 1
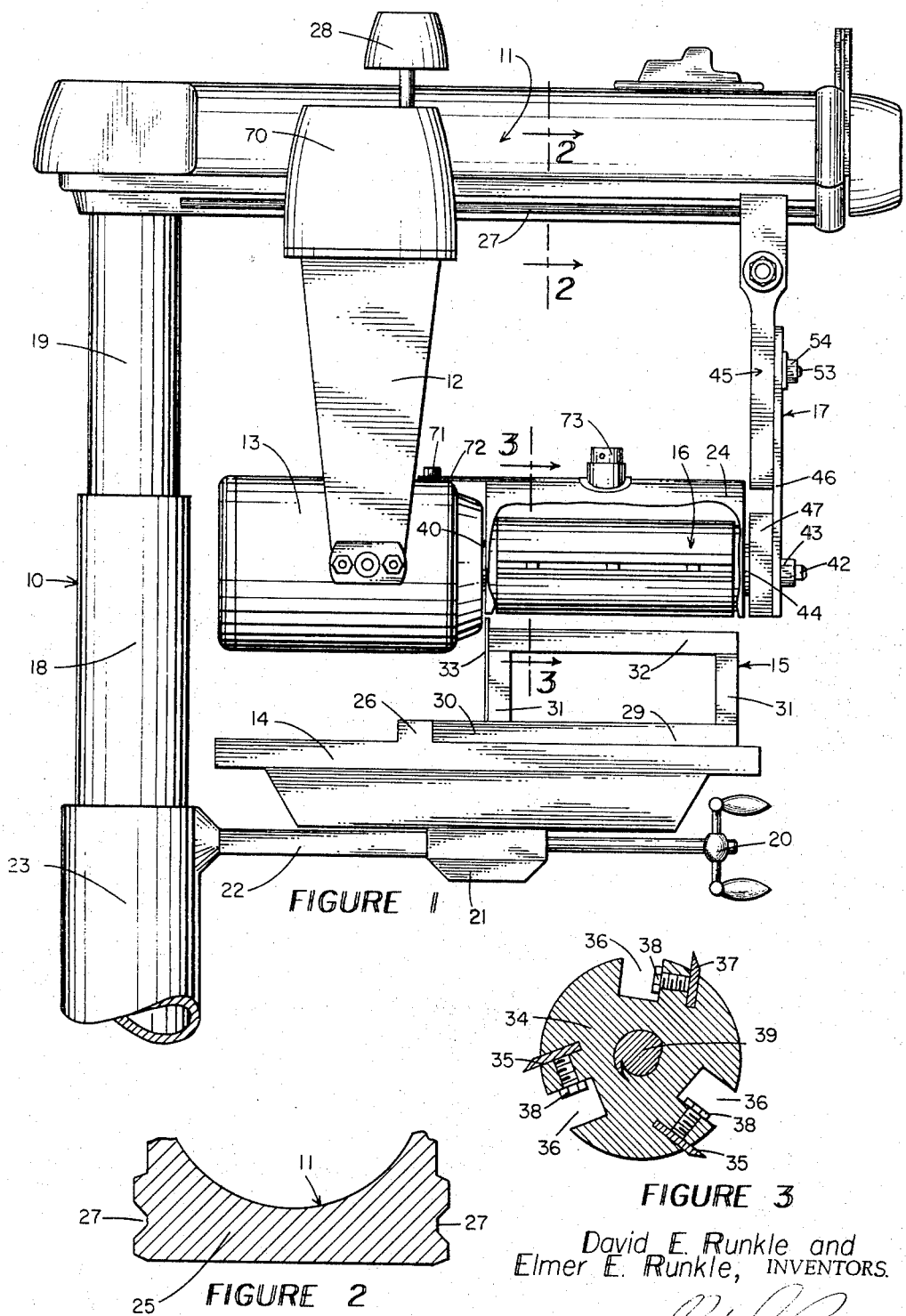
FIGURE 1
FIGURE 2
FIGURE 3
David E. Runkle and
Elmer E. Runkle, INVENTORS.
BY 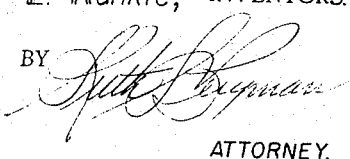
ATTORNEY.

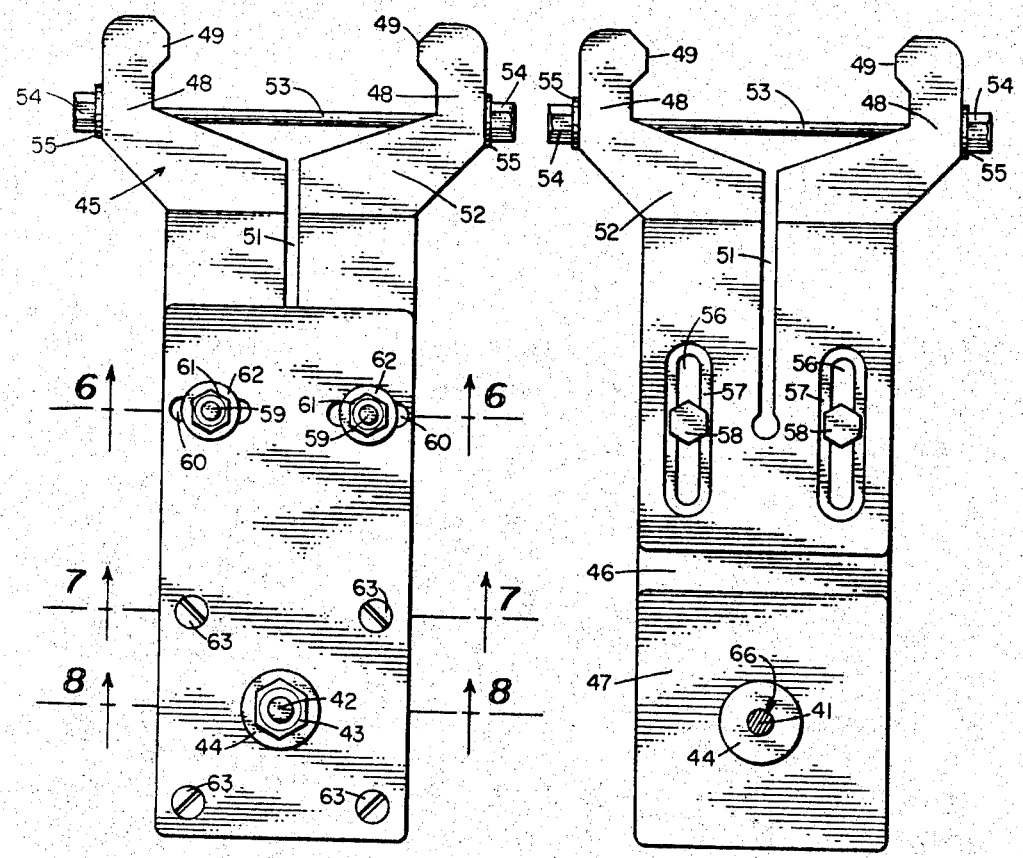

United States Patent Office 3,404,714
Patented Oct. 8, 1968

3,404,714
PLANER ATTACHMENT FOR RADIAL ARM SAW
David E. Runkle, E. 3308 Indiana, Spokane, Wash. 99207, and Elmer E. Runkle, Heron, Mont. 59844
Filed Aug. 1, 1966, Ser. No. 569,187
4 Claims. (Cl. 144—117)

This invention relates generally to a planer attachment for use in conjunction with an existing saw structure and more particularly to such a device that is adapted for use with radial arm type saws of commerce.

Heretofore the commercial radial arm saw has become a common tool both in commercial shops and many home workshops. A planing or surfacing machine is not such a common tool, especially in home workshops, and it therefore is desirable that such radial arm saws of commerce might be provided with an attachment to convert them for use as a planer. It is also desirable in certain applications that this planing head function upon the upper surface of the work being planed, rather than the lower surface as is the case in most commercial planers. With this background in mind, the instant invention was conceived, and in so doing, it is:

A principal object of our invention to provide a planing and surfacing device that attaches to an ordinary radial arm saw of commerce to be powered thereby and function therewith.

A further object of our invention to provide a device of the nature aforesaid that performs its operation upon the upper surface of material operated upon, where the operation might be in full view of the operator and waste material might be simply dealt with.

A still further object of our invention to provide a device of the nature aforesaid that provides an absolute thickness control to aid in planing skewed material to a rectilinear solid.

A still further object of our invention to provide such a device that is readily adjustable as to position and nature of cut and requires no split table of varying heights for its operation.

A still further object of our invention to provide a planer attachment that is of new and novel design, of simple and economic manufacture, of rugged and durable nature, and well adapted to the use for which it is intended.

These and other objects of our invention will become apparent from a consideration of the following specification and accompanying drawings which form a part of this application.

In carrying out the objects of our invention, it is to be understood that its essential features are susceptible of change in design and structural arrangement, with only one preferred and practical embodiment being illustrated in the accompanying drawings, as required.

In the accompanying drawings, wherein like numbers of reference refer to similar parts throughout:

FIGURE 1 is an orthographic side view of our invention in place upon a typical radial arm saw of commerce with the hood partially cut away to show its nature, configuration and the relationship of the various members.

FIGURE 2 is a partial, horizontal, cross-sectional view of the lower portion of the saw arm of FIGURE 1, taken on the line 2—2 thereon, in the direction indicated by the arrows.

FIGURE 3 is an orthographic, vertical, cross-sectional view of the planer head of our invention taken on the line 3—3 of FIGURE 1, in the direction indicated by the arrows thereon.

FIGURE 4 is an orthographic view of the outer vertical surface of the support arm of our invention showing its construction from this aspect.

FIGURE 5 is a similar vertical, orthographic view of the inner surface of the same support arm shown in FIGURE 4.

FIGURE 6 is a horizontal, cross-sectional view of FIGURE 4, taken on the line 6—6 thereon, in the direction indicated by the arrows.

FIGURE 7 is a horizontal, cross-sectional view of FIGURE 4, taken on the line 7—7 thereon, in the direction indicated by the arrows.

FIGURE 8 is a horizontal, cross-sectional view of FIGURE 4, taken on the line 8—8 thereon, in the direction indicated by the arrows.

Referring now to the drawings in more detail and particularly to that of FIGURE 1, there will be seen the upper structure of an ordinary radial arm saw of commerce including supporting shaft 10, horizontal saw arm 11, vertical saw motor support 12 carrying saw motor 13, and work support table 14 carried by support shaft 10. Our invention comprises auxiliary support table 15 and planer head 16 covered by hood 24 and carried between motor 13 and support arm 17, adjustably supported by the horizontal saw arm.

In the normal commercial radial arm saw illustrated, the support shaft includes a principal outer shaft 18 supporting the entire machine on a base (not illustrated). Principal shaft 18 slidably carries within its structure inner shaft 19, adjustably vertically positionable therein by an appropriate gear and ratchet structure operated through control wheel 20. Principal outer shaft 18 also supports work table 14 by its under structure 21 communicating by table arm 22 to support collar 23, usually fixedly positioned on outer shaft 18. The upper surface of work table 14 is an elongate, planer member having stop 26 projecting thereabove to provide a working fence.

Horizontal saw arm 11 is a cantilevered beam supported on the inner saw arm shaft 19 for vertical and angular positioning. The lower portion 25 of this arm 11 has lengthwise extending, paired, opposed grooves 27 adapted to slidably support vertical saw motor support 12 adjustably positionable thereon by clamping mechanism 70 operated through saw arm positioning knob 28. Saw motor 13 is suspended at the lowermost portion of vertical saw motor support 12 with its axle positioned for rotation about an axis parallel to the upper surface of work table 13 and beam 11 and perpendicular to support shaft 10, all as illustrated in FIGURE 1 and well known in the radial saw art.

Our invention includes the auxiliary support table 15 and planer head 16 covered by hood 24 and supported between motor 13 and support arm 17, adjustably positioned on horizontal saw arm 11.

The auxiliary support table is designed to bring work into operative relationship with the planer head. It comprises an elongate member of non-essential length and width, but preferably of at least equal dimension with work support table 14 of the radial saw. The member shown in cross-section in FIGURE 1 comprises flat base 29, having lateral projection 30 communicating with work stop 26 of work table 14 for proper alignment, and supporting vertical upwardly-extending side members 31. Top work support member 32 rests on side members 31 and carries at its rearward edge the relatively thin work stop 33 adapted, in functioning as a work stop, to provide no interference with the planer mechanism when the planer head be immediately adjacent the upper surface of top work support member 32. This auxiliary support table is preferably formed from structurally joined wood members according to methods well known in the art. The auxiliary support table may be structurally releasably attached to the saw work support table if desired, but we have found this generally not to be necessary, with friction and gravity sufficiently serving the purpose.

The planer head of our invention comprises cylindrical body member 34 having elongate blade slots 35 and spaced associated fastening slots 36, each parallel to the axis of rotation of the member. We prefer three such blade channels symmetrically spaced about the periphery of body 34 to simply maintain dynamical rotary balance, though obviously other numbers may be used. Elongate planer blades 37, of ordinary commercial construction, are adjustably and releasably carried within blade slots 35 by means of a plurality of spaced headed studs 38 threadedly engaged through that portion of the body member between the spaced fastening slots and blade slots, as illustrated in the cross-sectional view of FIGURE 3. The fastening slots must obviously have appropriate dimension to allow studs 38 to be inserted in the first instance. The number of studs 38 associated with each blade is not critical but we have found three substantially equally spaced studs to be quite workable. Fastening slots 36 also serve a further purpose of providing space for shavings taken from work by the blades until such time as they can be removed from the planer head assembly.

A central axially aligned, internally threaded bore 39 is provided in the motor end of body member 34 to threadedly receive the externally threaded drive shaft of motor 13. The threading of these members must obviously be opposite the direction of rotation of the motor. A flat-sided spanner collar 40 of ordinary commercial design is provided to aid in screwing the planer head on the motor shaft.

The outer end of the planer head is provided with short, laterally extending stud shaft 41, irrotatably communicating and axially aligned with planer head 16. This shaft is threaded in its outer portion 42 to receive nut 43 to maintain the planer head in lateral alignment between the motor and support arm. Preferably washers 44 are provided at the outer end of the planer head to absorb rotary motion relative the adjacent supporting structures and provide some end thrust adjustment and limitation of the planer head.

The outer support arm is shown bestly in the orthographic illustrations of FIGURES 4 and 5. It comprises upper yoke member 45 communicating by fastening plate 46 to lower bearing plate 47.

The upper yoke member has arms 48 with opposed inwardly facing teeth 49 adapted to communicate with grooves 27 in the lower part of the saw arm and provide a slidable but yet fastenable engagement therein. The yoke is split in its central part by slot 51 downwardly into yoke body 52 to allow some slight motion of yoke arms 48 toward each other, in response to appropriate motion of nuts 54 carried on stud 53 extending therebetween. This stud is carried in appropriate bores through arms 48 and is adjusted by moving the nuts 54 on the threaded end portions. Washers 55 provide a rotatable communication between the inner face of nuts 54 and outer surface of yoke arms 48. With this adjustment structure, the yoke arm is formed so that it slidably engages grooves 27 of the saw arm when in non-strained condition and may be releasably fastened thereon by tightening one or both of nuts 54. Inner surface of yoke body 52 has opposed, parallel, vertically extending fastening slots 56 with recessed rims 57 to receive heads 58 of bolts 59 in a flush fashion. These slots provide for adjustment of fastening plate 46 relative to yoke member 45 in a vertical plane.

Fastening plate 46 is a rectangular planer member, as illustrated, communicating between yoke member 45 and bearing plate 47, as illustrated, to provide a structurally rigid, yet adjustable attachment therebetween. Horizontally extending slots 60 are provided in the upper portion of the plate to adjustably receive bolts 59 therethrough. Such bolts are held in position by nuts 61 bearing against washers 62 positioned upon the outer surface of fastening plate 46. The lower portion of the fastening plate supports the bearing plate by studs 63 carried in appropriate bores 64 and threadedly engaged within the bearing plate 47. An appropriate hole 65 is provided for the projection of bearing 66 so that it and the shaft carried therein may operate without interference from fastening plate 46. Preferably studs 63 have countersunk heads so that they do not project laterally outward beyond the outer surface of fastening plate 64.

Bearing plate 47 is a rectangular member carrying in its central portion the press-fit bearing 66 with outer race 67 and inner race 68 rotatably journaling shaft 41 of the planer head. Inner race 68 of the bearing has a slight laterally extending lip to seat nut 43 to maintain the planer head assembly 16 in appropriate lateral position.

Hood 24 is a half cylindrical structure covering the upper surface of the planing head. It is shown, partially cut away, in FIGURE 1, where it is seen that the member is of standard well known construction and mounts on saw motor 13 by means of stud 71 threadedly engaged through the hood fastening bracket 72, into the motor case. This member may be pivotably mounted by well known means, if desired, but such generally is not necessary with this type of hood mounting, as the hood moves vertically, with reference to the work, in response to motor motion. The hood also provides a convenient collector for shavings, dust and debris and allows its convenient collection therefrom by a vacuum system (not shown) communicating therewith through vacuum orifice 73.

From the foregoing description of an embodiment of our invention, its operation is relatively obvious. The mechanism is constructed according to the foregoing specification and auxiliary work table 15 placed in appropriate position upon work support table 14. Planer head 16 is then threadedly engaged upon the saw motor shaft and support arm 17 is positioned on horizontal saw arm 11 with shaft 41 rotatably engaged in bearing 66. Nut 43 is then engaged on the threaded portion 42 of shaft 41 to maintain the assembly in lateral alignment and the support arm 17 is appropriately adjusted for alignment and firmly attached to horizontal saw arm 11 by tightening the nut on stud 53. Hood 24 is then positioned and in this condition the attachment is ready to operate. When activated by saw motor 13, it will plane material supported on the upper surface of auxiliary support table 15 according to the usual custom and procedure of the wood working art.

It is to be noted that in the planing operation, the work operated upon is planed from its upper surface so that the work area is immediately visible at all times. It is further to be noted that with the work in this position, various debris caused from the operation may normally be picked up with the vacuum systems usually associated with radial arm saws. It is further to be noted that this attachment will accomplish all of the various planing operations normally carried out with the more traditional head-under-table planing machines, and provides an absolute thickness control relative to the upper surface of the work table.

The foregoing description of our invention is necessarily of a detailed nature so that a specific embodiment of it may be set forth as required, but it is to be understood that various modifications of detail and rearrangement and multiplication of parts may be resorted to without departing from its spirit, essence or scope.

Having thusly described our invention, what we desire to protect by Letters Patent and

What we claim is:

1. A planer attachment for radial arm saws of commerce of the type having a vertical, adjustable support carrying in its upper extension a horizontal saw arm with rail like grooves and at a spaced distance therebelow a parallel horizontal work table with work stop thereon and a motor slidably carried on said saw arm, depending therefrom with shaft positioned for rotation about a horizontal axis at a spaced distance above said work table, comprising, in combination:

a cylindrical planer head adjustably carrying a plurality of elongate planer blades adapted upon rotary motion of said head to plane a surface therebelow, said head secured to the shaft of said motor to rotate therewith and having a laterally extending stud shaft at the end most distal from said motor, said planer head being slidable with said motor; and a lateral support arm adjustably communicating with said horizontal saw arm and depending therefrom, including means of adjustably fastening said support arm to said horizontal saw arm and of adjustably positioning a planer head supporting bearing adjustably carried by the lower part thereof in the vertical plane to receive said stud shaft.

2. The invention of claim 1 wherein said support arm is further characterized by a yoke having spaced upper arms with paired opposed, inwardly projecting teeth adapted to slidably engage rail-like grooves on said horizontal arm of said radial saw, with a slot extending between said arms to aid elastic motion of said arms toward each other and a stud extending therebetween carrying a nut on at least one end to force said yoke arms toward each other to clamp said yoke on said horizontal saw arm.

3. The invention of claim 1 wherein said means of vertical adjustment of said support bearing are further characterized by a three-piece structure of said support arm including an upper yoke member, intermediate fastening plate and a lower bearing member carrying said support bearing, the junction between at least two of said members being slidably adjustable by means of communication of bolts therebetween through elongate slots therein.

4. The invention of claim 1 further characterized by an auxiliary support table having a base member communicating with the work stop of said saw table and upwardly extending sides supported thereby carrying an elongate planer work support top with a work stop at one lateral extension thereof adapted to position work for planing by said planer head without interference therewith.

References Cited

UNITED STATES PATENTS

| | | | |
|---|---|---|---|
| 1,148,499 | 8/1915 | Cash | 144—2.4 |
| 1,855,528 | 4/1932 | Onsrud. | |
| 2,577,975 | 12/1951 | Moore | 144—117 |
| 3,099,298 | 7/1963 | Bellini | 144—1 |

DONALD R. SCHRAN, *Primary Examiner.*